(12) United States Patent
Aftanas et al.

(10) Patent No.: US 8,096,454 B2
(45) Date of Patent: Jan. 17, 2012

(54) SYSTEM AND METHOD FOR VEHICLE ARTICLE CARRIER HAVING STOWABLE CROSS BARS

(75) Inventors: Jeffrey M. Aftanas, Ortonville, MI (US); Donald R. Potter, Clarkston, MI (US); Noel V. Ranka, Canton, MI (US); Gerard J. Kmital, Allen Park, MI (US)

(73) Assignee: JAC Products, Inc., Saline, MI (US)

( * ) Notice: Subject to any disclaimer, the term of this patent is extended or adjusted under 35 U.S.C. 154(b) by 773 days.

(21) Appl. No.: 12/243,260

(22) Filed: Oct. 1, 2008

(65) Prior Publication Data

US 2010/0078453 A1 Apr. 1, 2010

(51) Int. Cl.
*B60R 9/045* (2006.01)

(52) U.S. Cl. ..................................... 224/321

(58) Field of Classification Search .................. 224/321
See application file for complete search history.

(56) References Cited

U.S. PATENT DOCUMENTS

| | | | |
|---|---|---|---|
| 3,165,353 A | 1/1965 | Weise |
| 3,670,935 A | 6/1972 | Hinkston |
| 3,838,802 A | 10/1974 | Grycel, III |
| 4,132,335 A | 1/1979 | Ingram |
| 4,225,068 A | 9/1980 | Ingram |
| 4,239,138 A | 12/1980 | Kowalski |
| 4,295,587 A | 10/1981 | Bott |
| 4,345,705 A | 8/1982 | Graber |
| 4,406,386 A | 9/1983 | Rasor et al. |
| 4,416,406 A | 11/1983 | Popeney |
| 4,469,261 A | 9/1984 | Stapleton et al. |
| 4,473,178 A | 9/1984 | Bott |
| 4,487,348 A | 12/1984 | Mareydt |
| 5,004,139 A | 4/1991 | Storm et al. |
| 5,071,050 A | 12/1991 | Pudney et al. |
| 5,104,018 A | 4/1992 | Dixon |
| 5,273,195 A | 12/1993 | Cucheran et al. |
| 5,340,007 A | 8/1994 | Jeuffray et al. |
| 5,372,287 A | 12/1994 | Deguevara |
| 5,377,890 A | 1/1995 | Brunner et al. |
| 5,385,285 A | 1/1995 | Cucheran et al. |
| 5,395,024 A | 3/1995 | Luchtenberg |
| 5,411,196 A | 5/1995 | Lee, Jr. et al. |
| 5,464,140 A | 11/1995 | Hill |
| 5,470,003 A | 11/1995 | Cucheran |
| 5,511,709 A | 4/1996 | Fisch |
| 5,529,231 A | 6/1996 | Burgess |
| 5,549,229 A | 8/1996 | Grabowski |
| 5,577,649 A | 11/1996 | Lee, Jr. et al. |

(Continued)

FOREIGN PATENT DOCUMENTS

| | | |
|---|---|---|
| DE | 2939672 | 4/1981 |
| DE | 2945950 | 5/1981 |
| DE | 3029586 | 3/1982 |
| DE | 3201409 | 9/1983 |
| DE | 3641745 | 6/1988 |
| DE | 3814799 | 11/1988 |
| DE | 29504783 | 5/1995 |
| EP | 1470960 | 10/2004 |
| EP | 1728686 | 12/2006 |
| FR | 2661378 | 10/1991 |
| FR | 2699475 | 6/1994 |
| FR | 2713568 | 6/1995 |
| FR | 2828854 | 2/2003 |
| GB | 2381252 | 4/2003 |
| JP | 5502199 | 4/1993 |
| JP | 11034751 | 2/1999 |
| WO | WO 9108929 | 6/1991 |

Primary Examiner — Justin Larson
(74) *Attorney, Agent, or Firm* — Harness, Dickey & Pierce, P.L.C.

(57) ABSTRACT

A vehicle article carrier system adapted to be secured to an outer body surface of a vehicle. The system includes a pair of support rails secured to the outer body surface and at least one cross bar. The cross bar has end supports that are able to pivot. The end supports may be secured to the support rails to place the cross bars in an operative position extending generally perpendicularly between the support rails, and elevationally above the support rails. The end supports also enable the cross bar to be placed in a stowed position along the slats where each of the end supports lay generally co-linear with a central portion its respective cross bar.

20 Claims, 4 Drawing Sheets

U.S. PATENT DOCUMENTS

| | | |
|---|---|---|
| 5,588,572 A | 12/1996 | Cronce et al. |
| 5,624,063 A | 4/1997 | Ireland |
| 5,758,810 A | 6/1998 | Stapleton |
| 5,782,391 A | 7/1998 | Cretcher |
| 5,791,536 A | 8/1998 | Stapleton |
| 5,826,766 A | 10/1998 | Aftanas |
| 5,845,829 A | 12/1998 | Stapleton |
| 5,884,824 A | 3/1999 | Spring, Jr. |
| 6,015,074 A | 1/2000 | Snavely et al. |
| 6,102,265 A | 8/2000 | Stapleton |
| 6,286,739 B1 | 9/2001 | Stapleton |
| 6,409,063 B1 | 6/2002 | Kmita et al. |
| 6,415,970 B1 | 7/2002 | Kmita et al. |
| 6,467,663 B1 | 10/2002 | Kmita et al. |
| 6,722,541 B1 | 4/2004 | Aftanas et al. |
| 6,811,066 B2 | 11/2004 | Aftanas et al. |
| 6,959,845 B2 | 11/2005 | Aftanas et al. |
| 7,066,364 B2 | 6/2006 | Kmita et al. |
| 7,090,103 B2 | 8/2006 | Aftanas et al. |
| 7,448,523 B2 | 11/2008 | Aftanas et al. |

SYSTEM AND METHOD FOR VEHICLE ARTICLE CARRIER HAVING STOWABLE CROSS BARS

FIELD

The present disclosure relates to vehicle article carrier systems, and more particularly to a vehicle article carrier system and method having stowable cross bars that can be stowed in a compact, generally hidden manner when not in use.

BACKGROUND

The statements in this section merely provide background information related to the present disclosure and may not constitute prior art.

Vehicle article carrier systems are used on a wide variety of motor vehicles to transport objects above an outer surface of a vehicle. Typically such vehicle article carriers are secured on an outer body surface of a vehicle, for example such as on a roof of the vehicle. A vehicle article carrier often includes one, but more typically two, cross bars that are supported on support rails, where the support rails are fixedly secured to the roof of the vehicle. The cross bars are supported on the support rails so that they extend laterally (i.e., width-wise) above the outer body surface of the vehicle between the two support rails. The cross bars are thus supported above the outer body surface and used to support articles thereon, typically with the assistance of cargo straps such as bungee cords, rubber cords or nylon cords.

While such vehicle article carriers are highly useful for transporting articles thereon, the cross bars do typically add a small degree of wind resistance as the vehicle travels. With the present day emphasis on maximizing fuel economy of vehicles of all types, there is an increased interest in providing a vehicle article carrier construction which can eliminate the wind resistance of the cross bars when the cross bars are not needed. To this end many vehicle article carriers incorporate cross bars that can be removed, although removal can sometimes require special tools and somewhat time consuming procedures. If removed, then the cross bars need to be stored somewhere. Since the cross bars typically have a length which is close to the overall width of the outer body surface of the vehicle (i.e., the roof portion), the cross bars are not always easily stored inside the vehicle. Even if they are able to be stored inside the vehicle, they may use up a considerable amount of otherwise available cargo space inside the vehicle or otherwise interfere with the full use of the available cargo space within the vehicle. Storing the cross bars off of the vehicle, such as in one's garage, is an option, but then that gives rise to the possibility that an unanticipated need may arise to use the vehicle article carrier, and the user may not have the cross bars with him/her in the vehicle.

SUMMARY

In one aspect the present disclosure relates to a vehicle article carrier system for use on an outer body surface of a vehicle to removably support articles above the outer body surface. The system may comprise: a pair of support rails secured to the outer body surface generally parallel to one another, and extending along a major longitudinal axis of the vehicle; the support rails each including a first attachment point and a pair of second attachment points; at least one cross bar having dimensions sufficient to extend between the support rails when the support rails are secured to the outer body surface of the vehicle. The cross bar may have: a central portion; a pair of end supports at opposite ends of the central portion; each said end support being hingedly secured to its respective end of the central portion and moveable between a first position substantially parallel with the central portion, and a second position extending non-parallel to the central portion; each said end support including an attachment component adapted to engage with the first attachment points of the support rails when the cross bar is in an operative position extending generally perpendicularly between the support rails; and the attachment components of the cross bar adapted to engage with the pair of second attachment points on one of the support rails when in a non-operative position so as to be stowed closely against and generally parallel to the one support rail.

In another aspect the present disclosure relates to a vehicle article carrier system for use on an outer body surface of a vehicle to removably support articles above the outer body surface, the system comprising: a pair of support rails secured to the outer body surface generally parallel to one another, and extending along a major longitudinal axis of the vehicle; the support rails each including a first attachment point and a pair of second attachment points; at least one cross bar having dimensions sufficient to extend between the support rails when the support rails are secured to the outer body surface of the vehicle. The cross bar may have: a central portion; a pair of end supports at opposite ends of the central portion; each said end support being hingedly secured to its respective end of the central portion and moveable between a first position substantially parallel with the central portion, and a second position extending non-parallel to the central portion; each said end support including an attachment component adapted to engage with the first attachment points of the support rails when the cross bar is in an operative position extending generally perpendicularly between the support rails, the end supports further extending at an angle of between about 30 degrees to about 90 degrees when the cross bar is positioned in the operative position; and the attachment components of the cross bar adapted to engage with the pair of second attachment points on one of the support rails when in a non-operative position so as to be stowed closely against and generally parallel to the one support rail, and the end supports being generally coplanar with the central portion of the cross bar when the cross bar is in the non-operative position.

In still another aspect the present disclosure relates to a vehicle article carrier system for use on an outer body surface of a vehicle to removably support articles above the outer body surface. The system may comprise: a pair of support rails secured to the outer body surface generally parallel to one another, and extending along a major longitudinal axis of the vehicle; the support rails each including a first attachment point and a pair of second attachment points; at least one cross bar having dimensions sufficient to extend between the support rails when the support rails are secured to the outer body surface of the vehicle; the cross bar having a central portion, a pair of end supports at opposite ends of the central portion, and each said end support including an attachment component adapted to engage with any of the first and second attachment points; each said end support being hingedly secured to its respective end of the central portion and moveable so as to position the central portion of the cross bar at an elevated position above the support rails when the attachment components are secured to the first attachment points of said pair of support rails, such that the cross bar is in an operative position; and each said attachment component of each said end support being securable to the second attachment points of one of the support rails to place the central portion and the end supports generally flush against said one support rail in a stowed, non-operative position when the cross bar is not needed for use.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
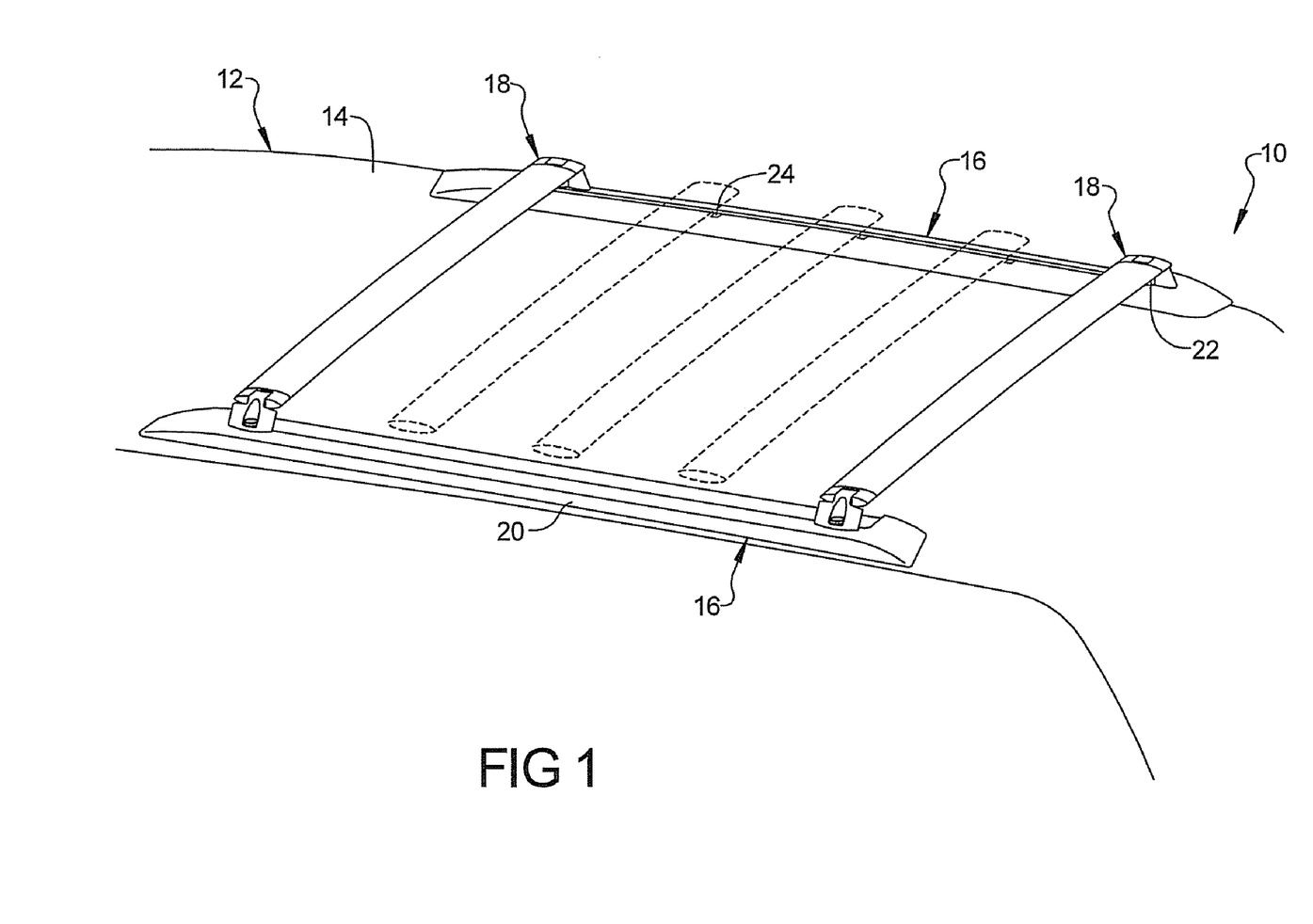
FIG. 1 is a perspective view of a portion of a vehicle illustrating one embodiment of a vehicle article carrier of the present disclosure mounted on an outer body surface of the vehicle, with the cross bars of the vehicle article carrier each being mounted in an operative position.

Referring to FIG. 1, there is vehicle article carrier system 10 supported on an outer body surface 14 of a vehicle 12. The vehicle 12 may comprise a car or sports utility vehicle (SUV), van, minivan or any other form of vehicle where it is desired to be able to support articles above its outer body surface. The system 10 may include a pair of support rails 16 that are fixedly secured to the outer body surface 14 generally parallel to one another, and extending generally parallel to a major longitudinal axis of the vehicle outer body surface 14. At least one, and more preferably a pair, of cross bars 18 are secured to the support rails 16. As will be explained more fully in the following paragraphs, it is a principal advantage of the system 10 that the cross bars 18 may be supported (or "stowed") in a substantially hidden, highly aerodynamic manner when not in use, but are able to be positioned above the support rails 16 quickly and easily when needed for use.

Figure 2:
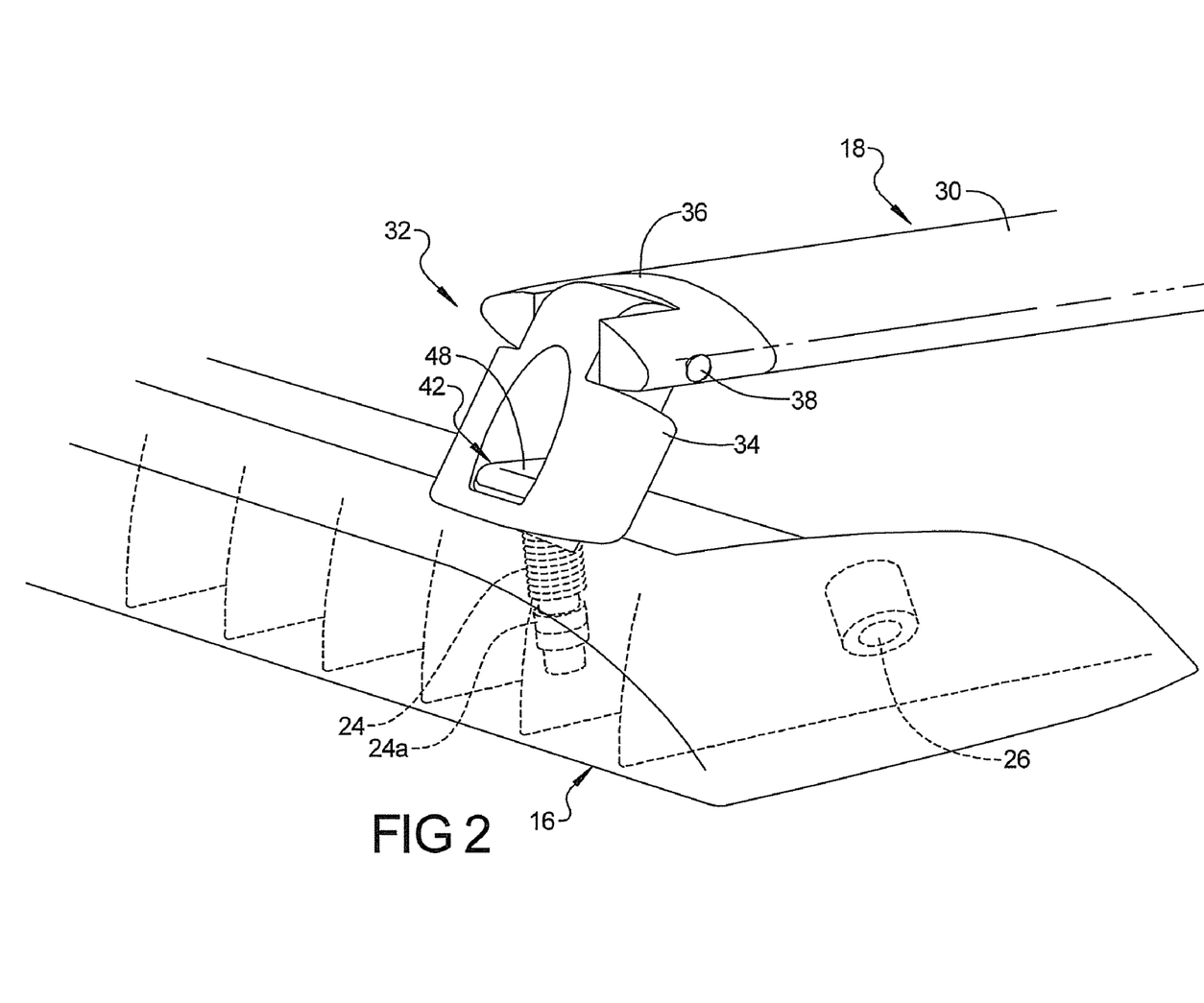
FIG. 2 is an enlarged perspective view of a portion of the vehicle article carrier of FIG. 1, with ones of the first and second attachment points being visible.

Referring further to FIG. 1, the support rails 16 each include a raised shoulder portion 20 and a recessed portion 22 extending along substantially a full length thereof. In FIG. 2 each support rail 16 has at least one first attachment point 24 and a pair of second attachment points 26. If two cross bars 18 are used with the system 10, then preferably a pair of first attachment points 24 will be incorporated. For the purpose of discussion it will be understood that a pair of cross bars 18 are used with the system 10. One pair of first attachment points 24 is arranged at opposite ends of each support rail 16. Similarly, one pair of second attachment points 26 is provided at the opposite ends of each of the support rails 16. Optionally but preferably, a plurality of additional first attachment points 24 are formed along each said support rail 16 that also enable each of the cross bars 18 to be secured at a plurality of different operative positions along the support rails 16 to better support variously sized and shaped articles thereon. The attachment points 24 are aligned so that at whatever longitudinal position along the support rails 16 the cross bars 18 are installed at for operation, the cross bars 18 will be extending generally perpendicularly between the support rails 16.

Referring to further to FIG. 2, one of the first attachment points 24 can be seen in greater detail. Each first attachment point 24 forms a threaded female bore that is aligned with an associated threaded fastening component 24a, such as a RIV-NUT™ fastener, fixedly secured in the outer body surface 14. Each second attachment point 26 forms a female threaded bore that is integrally formed in the support rail 16. Of course the second attachment point 26 could be formed by a metallic, press fit component having an internal threaded surface. Each first attachment point 26 will include an associated fastening component 24a aligned therewith and fixedly secured to the outer body surface 14. Thus, when the end supports 32 are attached at any pair of first attachments points 24, the cross bar 18 will be securely fastened to not only the support rails 16 but also to the outer body surface 14. This provides an extremely strong attachment arrangement for the cross bars 18.

In FIG. 2 the construction of one of the cross bars 18 can also be seen in greater detail. The cross bars 18 may be identical in construction, but they need not be. For convenience, it will be assumed that the cross bars 18 are identical in construction. The cross bar 18 shown in FIG. 2 includes a central portion 30 having an end support 32 at each opposite end thereof. The central portion 30 may form a tubular component made from a suitably strong material, for example aluminum or steel. The overall length of the cross bar 18 is sufficient to span the distance between the support rails 16 and is thus typically only slightly less than the overall width of the outer body surface 14 of the vehicle 12.

Each end support 32 includes a neck portion 34 that is hingedly secured to a base portion 36 via a pivot pin 38. This enables the neck portions 34 to hold the central portion 30 above the support rails 16 when the cross bar 18 is in its operative position shown in FIGS. 1 and 2. To accomplish this the neck portion 34 extends at an angle between about 20 degrees and 90 degrees relative to the outer body surface 14 of the vehicle 12, and more preferably between about 45 degrees and 75 degrees. The pivot pin 38 may be a splined pin that is press fit into the base portion 36 of the end support 32. The neck portion 34 may be secured to the central portion 30 of the cross bar 18 in conventional fashion by being inserted into a tubular end of the central portion 18 and being fastened thereto by threaded fasteners 39.

Figure 3:
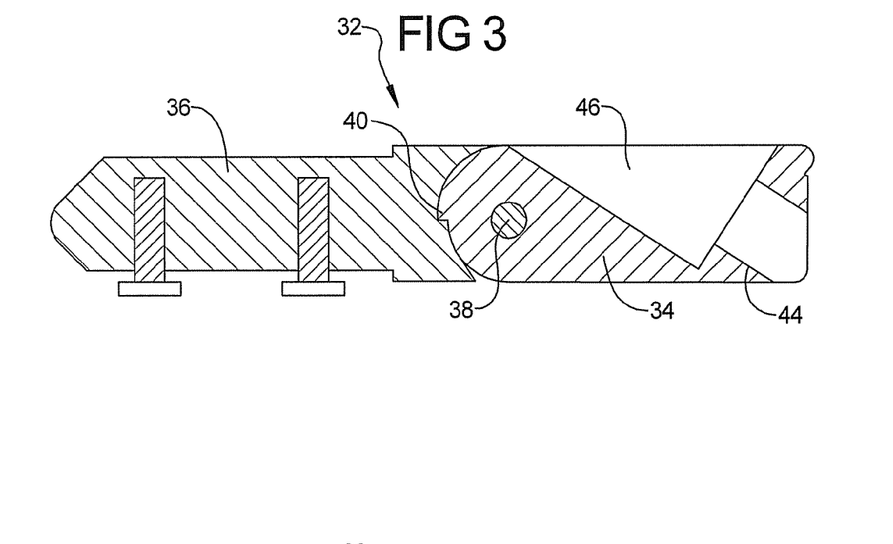
FIGS. 3 and 4 are partial cross sectional side views of one of the end supports illustrating the internal shoulder portion and internal wall portion that limit pivoting movement of the neck portion to a predetermined degree.
Figure 4:
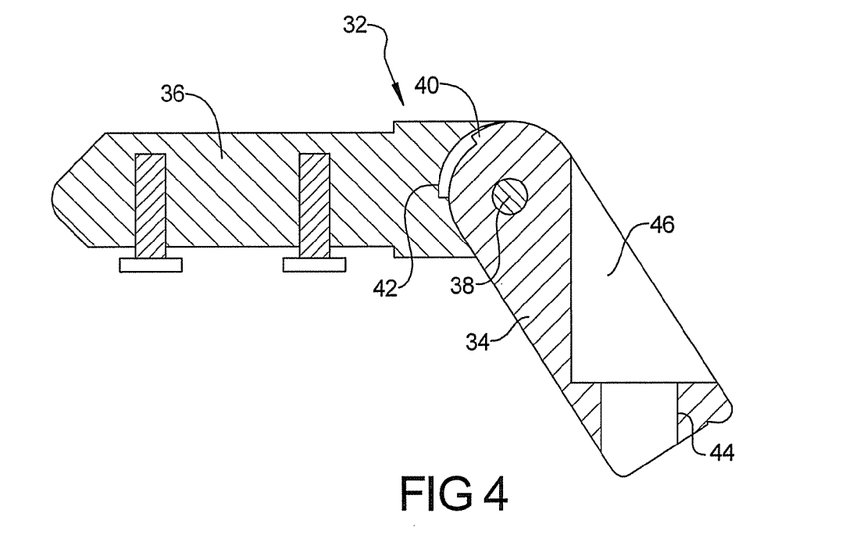

With further reference to FIGS. 3 and 4, the neck portion 34 can be seen to include an internal shoulder portion 40 that abuts an internal wall portion 41 of the base portion 36. This limits the pivoting motion of the neck portion 34 to a predetermined range and thus helps to provide rigidity to the cross bar 18 when the cross bar is in its operative position and supporting articles thereon.

With further reference to FIGS. 2, 3 and 4 the neck portion 34 also includes an attachment component in the form of a threaded male fastening element 42. The fastening element 42 extends through an opening 44 in a notched area 46 of the neck portion 34. The fastening element 42 can be secured in any one of the attachment points 24 or 26 to secure the end support 32 to a respective one of the support rails 16 in a stowed position or in an operative position. FIG. 2 shows the threaded fastening element 42 secured to one of the first attachment points 24. The threaded fastening element 42 may include a manually graspable wheel 48 that can be manually tightened and loosened by the fingers of one hand of the user, so that no external tools are required to remove and reposition the cross bar 18. Alternatively, the fastening element 42 may simply have a head portion with a slotted, Phillips, torx, etc. configuration that is loosened and tightened with a suitable tool.

Figure 5:
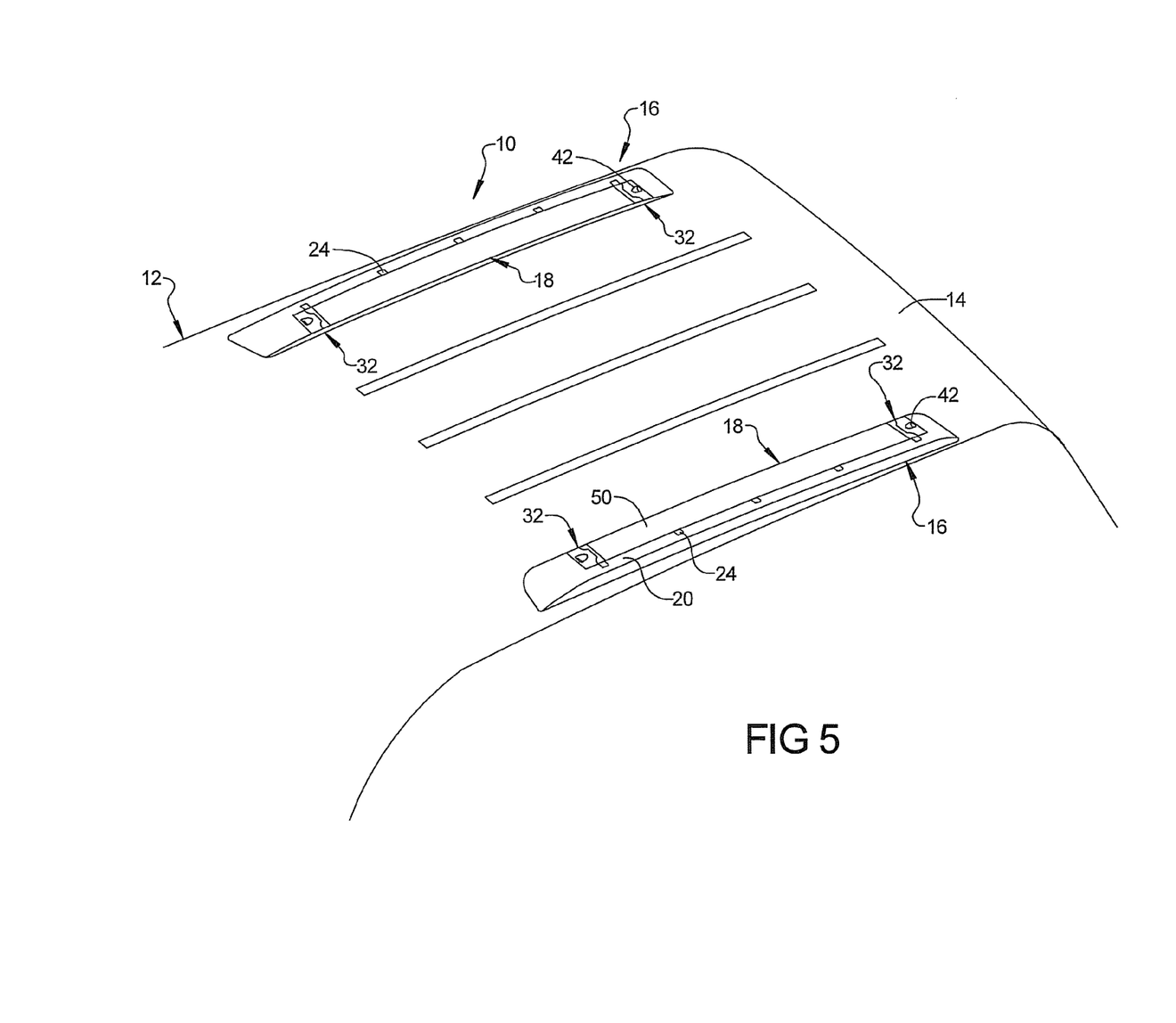
FIG. 5 is a view of the system of FIG. 1 but with both cross bars positioned in their stowed configurations.

Referring to FIG. 5 the cross bars 18 can be seen in their non-operative or "stowed" position. In the stowed position the threaded fastening component 42 is threadably engaged with the second pair of attachment points 26 at the opposite ends of the cross bar 18. In this configuration the cross bar 18 is essentially not visible from the side of the vehicle 12 and has an upper surface 50 that is substantially co-planar with the raised shoulder portion 20. This is because the neck portions 34 are able to pivot into position substantially in line with the central portion 30. Thus, when in its stowed position, the cross bar 18 provides no tangible aerodynamic drag during operation on the vehicle 12. The support rail 16 and the cross bar 18 essentially form a single, integrated and aesthetically pleasing assembly.

A particular feature that enables the neck portions 34 to lay flat and co-linear with the central portion 30 of the cross bar 18 is that the bores of the second attachment points 26 are formed at an angle to the outer body surface 14, as is visible in FIG. 2. In one embodiment this angle is between about 20-90 degrees, and more preferably between about 30 and 75 degrees.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system for use on an outer body surface of a vehicle to removably support articles above the outer body surface, the system comprising:
   a pair of support rails secured to the outer body surface generally parallel to one another, and extending along a major longitudinal axis of the vehicle;
   said support rails each including a first attachment point and a pair of second attachment points;
   at least one cross bar having dimensions sufficient to extend between the support rails when the support rails are secured to the outer body surface of the vehicle;
   said cross bar having:
      a central portion;
      a pair of end supports at opposite ends of said central portion;
      each said end support having a portion that is hingedly secured to its respective end of said central portion for pivotal movement about a generally horizontal pivot axis, and moveable between a first position substantially parallel with said central portion, and a second position extending non-parallel to said central portion such that said central portion is elevated above said end supports;
      each said end support including an attachment component adapted to extend into said first attachment points of said support rails when said cross bar is in an operative position extending generally perpendicularly between said support rails; and
   said attachment components of said end support adapted to engage at said pair of second attachment points on one of said support rails when in a non-operative position so as to be stowed closely against and generally parallel to said one support rail.

2. The vehicle article carrier of claim 1, wherein said one support rail includes a recessed portion within which said cross bar is positioned when said cross bar is secured to said one support rail in said stowed position.

3. The vehicle article carrier of claim 1, wherein said second attachment points of each said support rail form openings that extend at an angle of between about 20 degrees to about 70 degrees relative to said outer body surface of said vehicle.

4. The vehicle article carrier of claim 1, wherein each said end support includes structure preventing it from rotating beyond an angle of about 80 degrees relative to said outer body surface of said vehicle when said cross bar is secured to said support rails at said first pair of attachment points.

5. The vehicle article carrier of claim 1, wherein said attachment component of each said end support includes a manually engageable locking component that enables a user to manually engage and disengage said attachment component from said first and second attachment points.

6. The vehicle article carrier of claim 5, wherein said manually engageable locking component comprises a member graspable with the fingers of one hand.

7. The vehicle article carrier of claim 6, wherein said attachment component comprises a threaded male member and each of said attachment points includes an opening in line with a threaded female component that is fixedly secured to the outer body surface.

8. The vehicle article carrier of claim 7, wherein each said end support is adapted to be secured at said first attachment points such that said end supports extend at an angle between about 20 degrees and 90 degrees relative to said central portion of said cross bar, to thus position said central portion at an elevated position above said support rails.

9. The vehicle article carrier of claim 8, wherein each said end support is secured at said first attachment points such that said end supports each extend at an angle of between about 45 degrees and 75 degrees.

10. A vehicle article carrier system for use on an outer body surface of a vehicle to removably support articles above the outer body surface, the system comprising:
   a pair of support rails secured to the outer body surface generally parallel to one another, and extending along a major longitudinal axis of the vehicle;
   said support rails each including a first attachment point and a pair of second attachment points;
   at least one cross bar having dimensions sufficient to extend between the support rails when the support rails are secured to the outer body surface of the vehicle;
   said cross bar having:
      a central portion;
      a pair of end supports at opposite ends of said central portion;
      each said end support being hingedly secured to its respective end of said central portion for pivotal movement about a generally horizontal pivot axis, and moveable between a first position substantially parallel with said central portion, and a second position extending non-parallel to said central portion such that said central portion is elevated above said end supports;
      each said end support including an attachment component adapted to engage at said first attachment points of said support rails when said cross bar is in an operative position extending generally perpendicularly between said support rails, said end supports further extending at an angle of between about 30 degrees to about 90 degrees when said cross bar is positioned in said operative position; and said attachment components of said cross bar adapted to engage at said pair of second attachment points on one of said support rails when in a non-operative position so as to be stowed closely against and generally parallel to said one support rail, and said end supports being generally coplanar with said central portion of said cross bar when said cross bar is in said non-operative position.

11. The vehicle article carrier of claim 10, wherein said one support rail includes a recessed portion within which said cross bar is positioned when said cross bar is secured to said one support rail in said non-operative position.

12. The vehicle article carrier of claim 10, wherein said second attachment points of each said support rail form openings that extend at an angle of between about 20 degrees to about 70 degrees relative to said outer body surface of said vehicle.

13. The vehicle article carrier of claim 10, wherein said attachment component of each said end support includes a manually engageable locking component that enables a user to manually engage and disengage said attachment component from said first and second attachment points.

14. The vehicle article carrier of claim 13, wherein said manually engageable locking component comprises a member graspable with the fingers of one hand.

15. The vehicle article carrier of claim 14, wherein said attachment component includes a first threaded male member and each of said attachment points includes a female threaded portion.

16. A vehicle article carrier system for use on an outer body surface of a vehicle to removably support articles above the outer body surface, the system comprising:

a pair of support rails secured to the outer body surface generally parallel to one another, and extending along a major longitudinal axis of the vehicle;

said support rails each including a first attachment point and a pair of second attachment points;

at least one cross bar having dimensions sufficient to extend between the support rails when the support rails are secured to the outer body surface of the vehicle;

said cross bar having:

a central portion;

a pair of end supports at opposite ends of said central portion;

each said end support including an attachment component adapted to engage at any of said first and second attachment points;

each said end support being hingedly secured to its respective end of said central portion and moveable so as to position said central portion of said cross bar at an elevated position above said support rails when said attachment components are secured at said first attachment points of said pair of support rails, such that said cross bar is in an operative position; and each said attachment component of each said end support being securable at said second attachment points of one of said support rails to place said central portion and said end supports generally flush against said one support rail in a stowed, non-operative position when said cross bar is not needed for use.

17. The vehicle article carrier of claim 16, wherein said end supports extend at an angle of between about 30 degrees to about 90 degrees when said cross bar is positioned in said operative position on said support rails.

18. The vehicle article carrier of claim 16, wherein each said end support includes a raised shoulder portion and a recess adjacent the raised shoulder portion; and wherein said cross bar is positioned within said recess when in said non-operative position.

19. The vehicle article carrier of claim 16, wherein said attachment component of each said end support includes a manually engageable locking component that enables a user to manually engage and disengage said attachment component from said first and second attachment points without the use of an external tool.

20. The vehicle article carrier of claim 19, wherein said manually engageable locking component comprises a member graspable with the fingers of one hand.

* * * * *

UNITED STATES PATENT AND TRADEMARK OFFICE
CERTIFICATE OF CORRECTION

PATENT NO. : 8,096,454 B2  
APPLICATION NO. : 12/243260  
DATED : January 17, 2012  
INVENTOR(S) : Jeffrey M. Aftanas et al.

Page 1 of 1

It is certified that error appears in the above-identified patent and that said Letters Patent is hereby corrected as shown below:

\*\*Title Page, Item (75) Inventors: "Gerard J. Kmital, Allen Park, MI (US)" should be
-- Gerard J. Kmita, Allen Park, MI (US) --\*\*

Signed and Sealed this  
Third Day of April, 2012

David J. Kappos  
*Director of the United States Patent and Trademark Office*